Aug. 14, 1951     A. LATERNSER     2,564,116
RING METER
Filed March 19, 1947

INVENTOR
BY Albin Laternser
Morgan, Finnegan & Durham
ATTORNEYS

Patented Aug. 14, 1951

2,564,116

UNITED STATES PATENT OFFICE 2,564,116

RING METER

Albin Laternser, Horgen, Switzerland, assignor to Landis & Gyr, A. G., a body corporate of the Confederation of Switzerland Application March 19, 1947, Serial No. 735,563
In Switzerland April 26, 1946

3 Claims. (Cl. 73—405)

The present invention relates to new and useful improvements in ring meters for measuring small differential fluid pressures, for instance in flowing fluids, such as steam.

Heretofore, attempts have been made in known ring meters for pressure and quantity measurement to obtain a wide range of measurement for small effective pressures to enlarge the interface between the sealing liquid and the medium that is to be measured (or its condensate) in the ring, by providing symmetrical, tubular extensions in the median horizontal plane of the ring. Although increased displacement of the sealing liquid under smaller differences or pressure produces a high moment of adjustment in the ring, yet there is a risk of instability owing to the flowing of the sealing liquid out of the enlarged space forming the increased plane of separation, thus causing the ring to tilt beyond the degree corresponding to the pressure to be measured.

The object of the present invention is to remedy this defect in those ring meters in which the medium above the sealing liquid is a fluid and, therefore, cannot be compensated.

Figure 1:
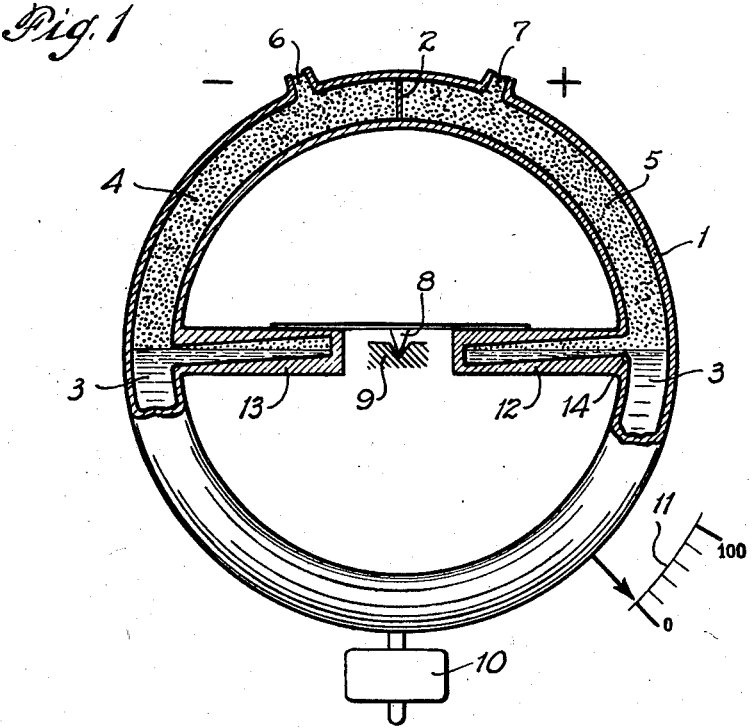
Figure 2:
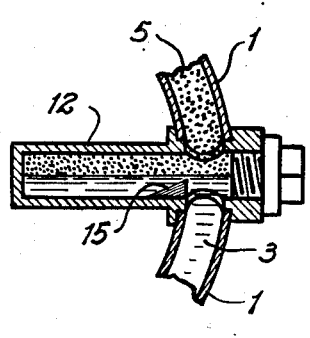

Of the drawings:

Figure 1 illustrates a preferred and typical embodiment of the invention diagrammatically and in partial section; and Figure 2 is a fragmentary detail of a modified embodiment of the invention.

In the first example, 1 denotes the closed, circular and tubular ring of the meter, in which a partition wall 2 and the upper face 3 of a sealing liquid—preferably mercury—form two chambers 4, 5. By means of two ports 6, 7, these chambers are connected with flexible metering conduits (not shown). With the level of the sealing liquid in line with the axial plane of the ring 1, this latter is supported, through a knife edge 8, on a bearing surface 9, and by means of a counterweight 10, is kept at zero position as measured on a scale 11, when the pressure in the chambers 4, 5 is in equilibrium.

In the vicinity of the level of the sealing liquid 3 when the pressure differential is zero, the conformation of the ring 1 is such that two hollow, radial chambers 12, 13 of uniform section are formed which extend towards each other in the internal space of the ring and are connected to and in communication with the tubular core of the ring. Those chambers slope at such an angle, when the ring is in zero position, that, on the side remote from the direction of rotation of the ring 1, i. e. the trailing side, they extend nearly to the plane of separation at the point 14 in the junction of the chambers and the ring.

Therefore, when the ring meter is in zero position, the chambers 12, 13 are filled, partly with the sealing liquid and partly with the medium to be measured, and the sealing liquid in the chambers forms a continuous body with that present in the circular portion of the ring, that is to say, the plane of separation between the sealing liquid and the medium forms a large unbroken surface in the system represented by the chambers 12, 13. When the ring tilts out of the zero position, owing to a slight pressure difference, and the continuity between the sealing liquid in the chambers and that in the annular part is interrupted at 14, the liquid in the chamber cannot flow into the annular portion; consequently, an unsteady displacement of the sealing liquid is prevented, and the angle of rotation of the ring is slight. This enables the range of measurement to be extended to near the zero point.

In the modified form of the invention as illustrated in Figure 2, the chambers 12 (or 13) may be formed as separate parts attached to the body of the ring 1. The chambers are in the form of cylindrical tubes, arranged radially in relation to the ring 1, and, at the point where their hollow portions join the ring, and on the side remote from the direction of rotation of the ring, i. e. the trailing side, they are formed with an inset number 15 forming a constriction which, like the lip 14 in the first example, extends nearly to the plane of separation between the sealing liquid and the medium, when the ring meter is in zero position.

The invention in its broader aspects is not limited to the specific mechanisms shown and described but departures may be made therefrom within the scope of the accompanying claims without departing from the principles of the invention and without sacrificing its chief advantages.

What is claimed is:

1. A ring meter for pressure or quantity measurements having an annular, tubular member with a central pivot and a partition wall above the pivot and a sealing liquid in the lower half of the tubular member and extending substantially to the horizontal plane of the pivot, inwardly extending, radial, tubular members connected to the annular member and lying substantially in the horizontal plane of the pivot so that the upper face of the sealing liquid lies in these radial tubular members, the radial tubular members each having a uniform section each radial tubular member at the junction with the annular tubular member having a trailing edge which extends nearly to the surface of the sealing liquid in zero datum position so that on a slight rotation of the annular tubular member from zero datum position the trailing edge breaks the upper face of the sealing liquid.

2. A ring meter according to claim 1 in which said radial tubular members are inwardly directed towards opposite sides of the pivot and are inclined with reference to the surface of the liquid when the ring is in the zero position.

3. A ring meter according to claim 1 in which each radial tubular member is provided with a restriction at the junction of the tubular member and ring.

ALBIN LATERNSER.

REFERENCES CITED

The following references are of record in the file of this patent:

UNITED STATES PATENTS

| Number | Name | Date |
|---|---|---|
| 1,504,045 | Horton | Aug. 5, 1924 |
| 2,456,713 | Laternser | Dec. 21, 1948 |

FOREIGN PATENTS

| Number | Country | Date |
|---|---|---|
| 157,986 | Germany | Jan. 27, 1905 |
| 537,550 | Germany | Nov. 4, 1931 |